United States Patent
Nagahashi et al.

(10) Patent No.: US 11,746,985 B2
(45) Date of Patent: Sep. 5, 2023

(54) VEHICLE LAMP HAVING A SILICONE RESIN PART COMPRISING LOW MOLECULAR WEIGHT SILOXANES

(71) Applicant: KOITO MANUFACTURING CO., LTD., Tokyo (JP)

(72) Inventors: Kunihiko Nagahashi, Shizuoka (JP); Hideki Tanaka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/922,716

(22) PCT Filed: Apr. 16, 2021

(86) PCT No.: PCT/JP2021/015739
§ 371 (c)(1),
(2) Date: Nov. 1, 2022

(87) PCT Pub. No.: WO2021/220848
PCT Pub. Date: Nov. 4, 2021

(65) Prior Publication Data
US 2023/0167963 A1     Jun. 1, 2023

(30) Foreign Application Priority Data

May 1, 2020   (JP) .................................. 2020-081466

(51) Int. Cl.
| | |
|---|---|
| *F21S 41/20* | (2018.01) |
| *F21S 45/00* | (2018.01) |
| *B60Q 1/04* | (2006.01) |
| *G02B 1/18* | (2015.01) |
| *F21S 41/36* | (2018.01) |

(52) U.S. Cl.
CPC ................ *F21S 45/00* (2018.01); *B60Q 1/04* (2013.01); *F21S 41/28* (2018.01); *F21S 41/285* (2018.01); *F21S 41/36* (2018.01); *G02B 1/18* (2015.01)

(58) Field of Classification Search
CPC .......... F21S 41/25; F21S 41/255; F21S 41/26; F21S 41/265; F21S 41/27; F21S 41/275; F21S 41/28; F21S 41/285
See application file for complete search history.

(56) References Cited

U.S. PATENT DOCUMENTS

| | | | | |
|---|---|---|---|---|
| 2002/0154407 | A1* | 10/2002 | Frazier ..................... | F21V 7/28 359/507 |
| 2019/0154223 | A1 | 5/2019 | Mizutani et al. | |
| 2019/0178461 | A1 | 6/2019 | Baba et al. | |

FOREIGN PATENT DOCUMENTS

| | | |
|---|---|---|
| JP | 2005-146227 A | 6/2005 |
| JP | 2014-078476 A | 5/2014 |
| JP | 2019-093564 A | 6/2019 |
| JP | 2019-102389 A | 6/2019 |

* cited by examiner

*Primary Examiner* — Robert J May
(74) *Attorney, Agent, or Firm* — Osha Bergman Watanabe & Burton LLP

(57) ABSTRACT

A vehicle lamp includes: a lamp body that has an opening in a direction of light radiation; a front cover that covers the opening to define a housing and includes, on an inner surface, an anti-fogging film mainly composed of a synthetic resin; a light source that is disposed in the housing; and a silicone resin part that is disposed in the housing. A content of D3 to D20 cyclic low molecular weight siloxanes in the silicone resin part is 0 ppm to 300 ppm in terms of mass.

6 Claims, 4 Drawing Sheets

VEHICLE LAMP HAVING A SILICONE RESIN PART COMPRISING LOW MOLECULAR WEIGHT SILOXANES

TECHNICAL FIELD

The present invention relates to a vehicle lamp, and particularly to a vehicle lamp including an anti-fogging film on an inner surface of a front cover.

BACKGROUND ART

In the related art, silicone resin parts have been used in vehicle lamps. In particular, in recent years, a lens made of a silicone resin has been adopted from the viewpoint of complicated shape and heat resistance (see Patent Literature 1).

The silicone resin is known to release a cyclic low molecular weight siloxane (hereinafter simply referred to as a low molecular weight siloxane) as outgas. The cyclic low molecular weight siloxane is a residue of a silicone resin raw material that remains unreacted during silicone resin molding. In particular, reducing the residual amount of D3 to D10 low molecular weight siloxanes is an index of the quality standard for the silicone resin. In the vehicle lamp, a silicone resin with a reduced amount of low molecular weight siloxanes (low siloxane control grade) in which the content of the D3 to D10 low molecular weight siloxanes is reduced to 300 ppm or less is also generally used.

On the other hand, a configuration in which an anti-fogging film is provided on an inner surface of a front cover is often adopted in the vehicle lamp (see Patent Literature 2). However, in recent years, in the vehicle lamp provided with an anti-fogging film, problems caused by deterioration in anti-fogging performance such as water dripping marks on the front cover have been studied.

CITATION LIST

Patent Literature

Patent Literature 1: JP2019-102389A
Patent Literature 2: JP2019-093564A

SUMMARY OF INVENTION

Technical Problem

Therefore, as a result of studies, the present inventors have found that in the vehicle lamp in the related art, the anti-fogging performance may deteriorate even though the silicone resin part with a reduced amount of low molecular weight siloxane is used.

The present invention has been made in view of such circumstances, and an object thereof to provide to prevent deterioration in anti-fogging performance in a vehicle lamp including a silicone resin part.

Solution to Problem

In order to achieve the above object, a vehicle lamp according to an aspect of the present invention includes: a lamp body that has an opening in a direction of light radiation; a front cover that covers the opening to define a housing and includes, on an inner surface, an anti-fogging film mainly composed of a synthetic resin; a light source that is disposed in the housing; and a silicone resin part that is disposed in the housing. A content of D3 to D20 cyclic low molecular weight siloxanes in the silicone resin part is 0 ppm to 300 ppm in terms of mass.

In a vehicle lamp in the related art, a silicone resin part having a controlled content of D3 to D10 is used, but the content of D11 to D20 is not taken into consideration. According to the above configuration, when the total content of the D3 to D20 low molecular weight siloxanes in the silicone resin part is reduced to be less than 300 ppm, it is possible to reduce the amount of the low molecular weight siloxane released from the silicone resin part in the housing, which is in a high temperature in a lighting state. As a result, the influence of the low molecular weight siloxane on the anti-fogging film formed on the inner surface of the front cover can be reduced, and deterioration in anti-fogging performance can be prevented.

In the above aspect, it is preferable that a lens that is disposed in the housing is further included and at least one of the silicone resin part is the lens.

In the above aspect, it is preferable that a content of D11 to D20 cyclic low molecular weight siloxanes in the silicone resin part is 0 ppm to 290 ppm in terms of mass.

In the above aspect, it is preferable that the content of the D3 to D20 cyclic low molecular weight siloxanes is 0 ppm to 20 ppm in terms of mass.

In the above aspect, it is preferable that the content of the D11 to D20 cyclic low molecular weight siloxanes is 0 ppm to 11 ppm in terms of mass.

It is preferable that the anti-fogging film contains an anti-fogging coating material containing any of anionic, cationic and nonionic surfactants.

In the present description, the "content of the low molecular weight siloxane" (unit: ppm) in the silicone resin part refers to a total content (in terms of mass) of specific cyclic dimethyl siloxanes (molecular formula $SiO(CH_3)_2$) per unit mass of the silicone resin part, and means a total content (in terms of mass) of D3 to D20 low molecular weight siloxanes in the case of the content of D3 (trimer) to D20 (20mer) low molecular weight siloxanes.

Advantageous Effects of Invention

According to the vehicle lamp in the above aspect, it is possible to provide to prevent deterioration in anti-fogging performance in a vehicle lamp including a silicone resin part.

DESCRIPTION OF EMBODIMENTS

Figure 1:
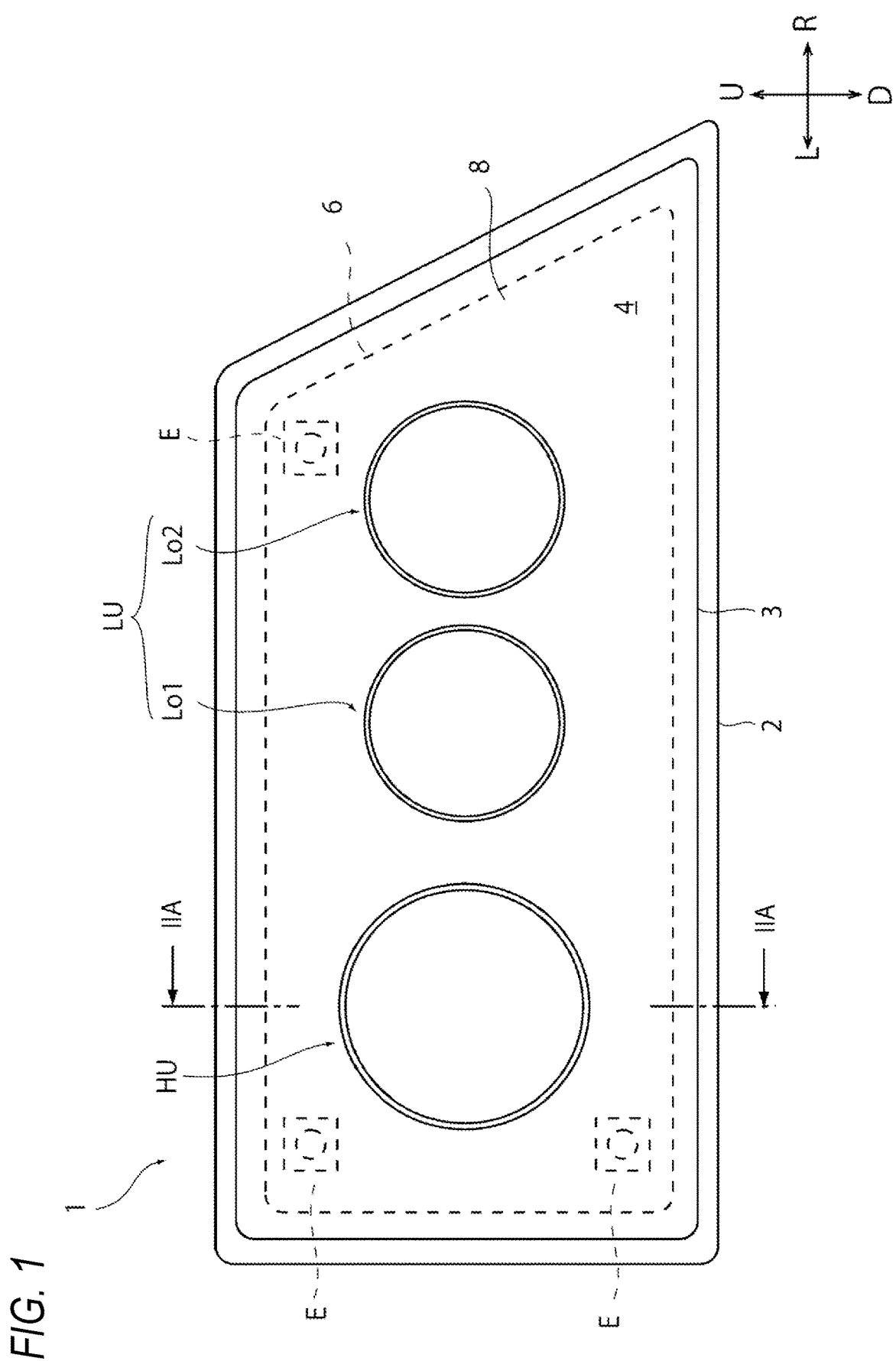
FIG. 1 is a schematic front view of a vehicle lamp according to an embodiment of the present invention.

Hereinafter, a preferred embodiment of the present invention will be described with reference to the drawings, but the present invention is not limited thereto.

In the following description, unless otherwise specified, a term indicating a direction such as up, down, left, or right with respect to a vehicle lamp (hereinafter, also simply referred to as "lamp") means a direction when the lamp is viewed from the front with the lamp attached to a vehicle. That is, the "front" of the lamp means the front of the vehicle, the left of the lamp means the right of the vehicle, and the right of the lamp means the left of the vehicle. In the drawings, arrows U-D indicate an up-down direction when the lamp is viewed from the front, arrows F-B indicate the same front-rear direction, and arrows L-R indicate the same left-right direction.

Embodiment

Overall Configuration of Lamp

Figure 2A:
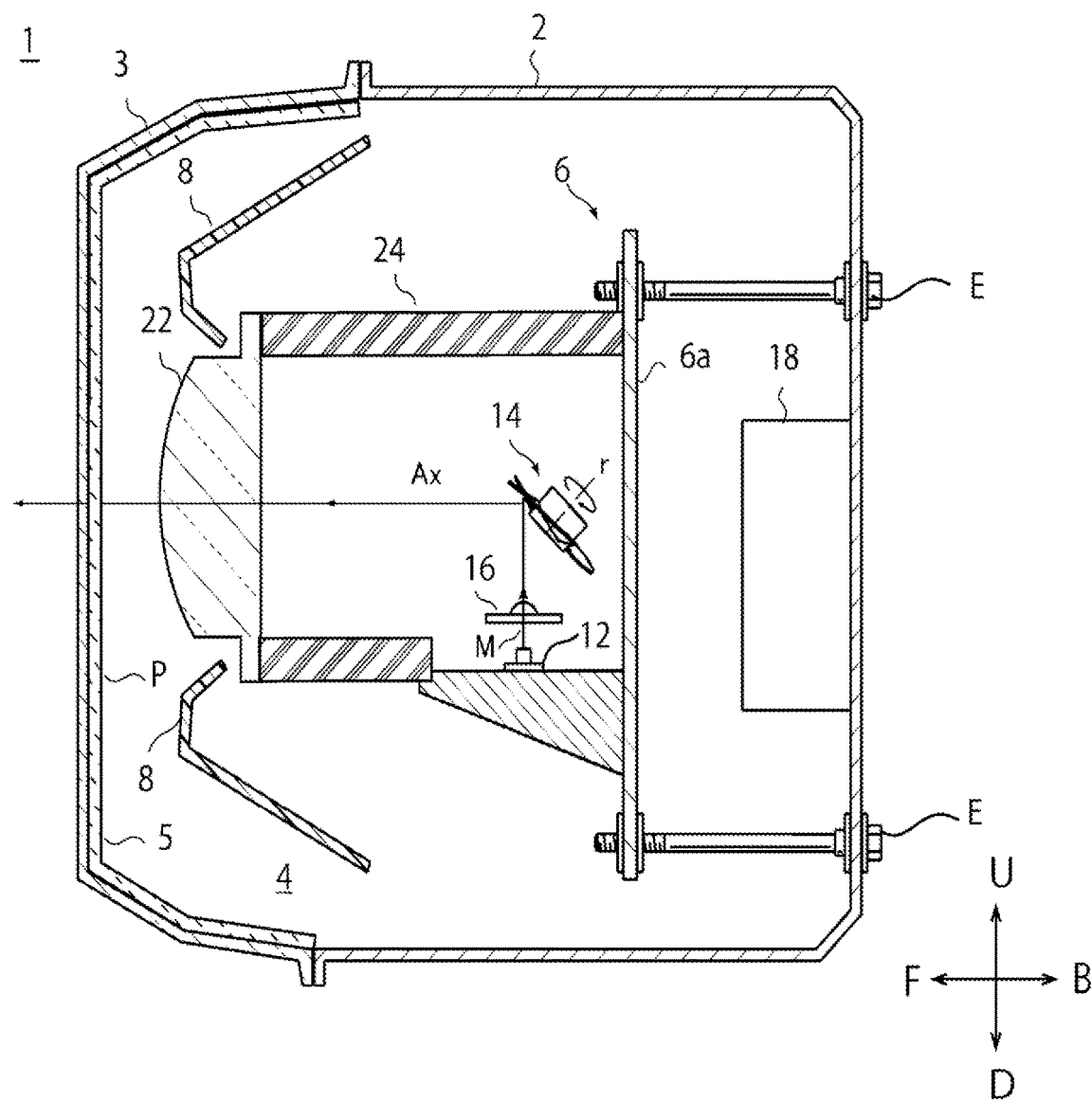
FIG. 2A is a schematic cross-sectional view of the vehicle lamp shown in FIG. 1 taken along a line IIA-IIA.

FIG. 1 is a front view schematically showing a schematic structure of a lamp 1 according to an embodiment of the present invention. FIG. 2A is a cross-sectional view of the lamp 1 along a line IIA-IIA in FIG. 1. The lamp 1 is a left or right head light unit of a vehicle head light device including a pair of head light units disposed on the left and right in the front of the vehicle. The pair of head light units have substantially the same configuration.

The lamp 1 roughly includes a lamp body 2, a front cover 3, a high beam unit HU, a low beam unit LU, and a bracket unit 6.

The lamp body 2 is made of a synthetic resin such as polypropylene, acrylonitrile, styrene, or acrylate (ASA), and has a box-like shape having a forward opening in a direction of light radiation. The front cover 3 defines a housing 4 by closing the opening of the lamp body 2.

The front cover 3 is made of, for example, a synthetic resin having excellent translucency and impact resistance. As the material, for example, polycarbonate (PC) or polymethyl methacrylate (PMMA) can be adopted. The front cover 3 may be transparent and may have a lens cut (not shown) formed in a part of an inner surface thereof.

An anti-fogging film 5 is formed on the inner surface of the front cover 3. The anti-fogging film 5 may be formed by using, for example, a spray gun to spray a translucent anti-fogging coating material P from a nozzle of the spray gun onto the inner surface of the front cover 3 and performing heating with warm air or the like to cure the film while moving the nozzle along the inner surface.

As the anti-fogging coating material P, for example, a known anti-fogging coating material containing any of anionic, cationic and nonionic surfactants, a resin such as an acrylic resin, and a curing agent (catalyst) can be adopted. For example, a curable anti-fogging coating material described in JP2005-146227A or the like may be adopted.

In the surfactant, hydrophobic groups are oriented toward the inner surface of the front cover 3, and hydrophilic groups face outward. Whereby, the anti-fogging performance of the anti-fogging coating material P containing the surfactant is exhibited such that interfacial tension between water and the front cover 3 at a contact point of the adhered water droplet is reduced and a contact angle at the contact point is reduced. A cyclic low molecular weight siloxane has low polarity, and when it adheres to the anti-fogging film, an effect of lowering the interfacial tension of the anti-fogging film 5 is reduced.

The high beam unit HU and the low beam unit LU are disposed in the housing 4. The high beam unit HU and the low beam unit LU are held by the bracket unit 6.

The high beam unit HU is a variable light distribution head lamp (ADB: adaptive driving beam) configured to form a predetermined shape or light distribution with light emitted forward, and can form a variable light distribution by adapting not only to a high beam light distribution but also to a driving situation of the vehicle and a surrounding situation.

The high beam unit HU includes a light source 12, a scanning mechanism 14, a condensing lens 16 that condenses light emitted from the light source 12 and causes the light to be incident on the scanning mechanism 14, a control unit 18 that controls the scanning mechanism 14 and the light source 12, a projection lens 22, and a lens holder 24. These components are supported by the bracket unit 6 by appropriate means.

The light source 12 is a semiconductor light emitting element such as a light emitting diode (LED) or an electro luminescence (EL). The light source 12 is not limited to this, and may be a laser diode (LD) element.

Figure 2B:
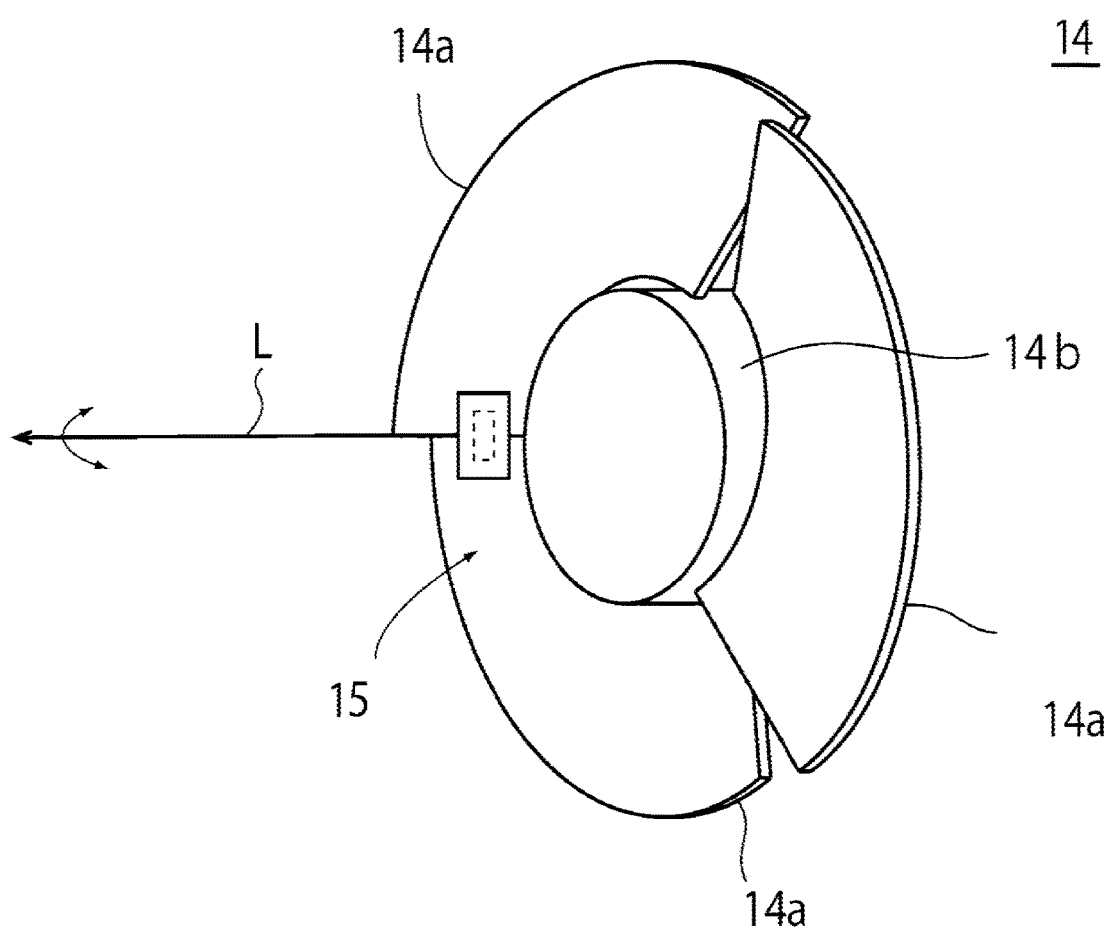
FIG. 2B is an enlarged view of a scanning mechanism in the vehicle lamp shown in FIG. 1.

As shown enlarged in FIG. 2B, the scanning mechanism 14 is a rotating reflector having a reflection surface 15 in which three blades 14a having the same shape are provided around a cylindrical rotating portion 14b, which is configured to rotate so as to reflect the light emitted from the light source 12 to form a desired light distribution pattern. A rotation axis r is oblique to an optical axis M of the light source, and is provided on a plane including the optical axis M and the light source 12.

The blade 14a has a shape enabling formation of a secondary light source caused by the reflection of the light source 12 near a rear focal point of the projection lens 22. Further, the blade 14a has a twisted shape such that an angle formed by an optical axis Ax and the reflection surface 15 changes toward a circumferential direction centered on the rotation axis r. The scanning mechanism 14 scans the light from the light source 12 in the left-right direction by reflecting the light reflected by the reflection surface 15 to change the direction while rotating around the rotation axis r.

The projection lens 22 is made of, for example, a translucent resin such as polycarbonate or PMMA, and radiates the light incident from the blade 14a forward.

As a result, the light from the light source 12 is condensed by the condensing lens 16 and incident on the rotating reflector, i.e., the scanning mechanism 14. The light incident on the rotating reflector is scanned left and right by the reflection surface 15. The projection lens 22 receives the light from the rotating reflector and radiates the light forward. In this way, in the high beam unit HU, the light incident at positions on the projection lens 22 overlaps to form a predetermined light distribution pattern.

The low beam unit LU includes a projector-type optical unit Lo1 including a light source which is a light emitting element, a reflector, and a projection lens. Since the optical unit Lo1 has a configuration same or similarly as a low beam unit described in, for example, JP2014-078476A, detailed description thereof will be omitted.

The low beam unit LU includes the optical unit Lo1 and an optical unit Lo2 having a configuration same or similarly as the optical unit Lo1, and the two optical units Lo1 and Lo2 form a low beam light distribution in front of the vehicle.

The bracket unit 6 includes a base plate 6a having a shape that conforms to a front shape of the lamp 1, and three aiming screws E provided at three positions at upper and lower sides. Optical axes of the high beam unit HU and the low beam unit LU are adjusted in a horizontal direction and a vertical direction by rotating the aiming screws E.

Reference numeral 8 in the housing 4 denotes an extension, which surrounds the low beam unit LU and the high beam unit HU so as to cover peripheries thereof.

Silicone Resin Part

Here, the condensing lens 16 which is a silicone resin part in the lamp 1 according to the present embodiment will be described. The condensing lens 16 is produced by injection molding using a highly transparent silicone resin for optical parts as a base polymer and a catalyst such as an organic peroxide or a platinum compound as a cross-linking agent. A total content of D3 to D20 low molecular weight siloxanes in the condensing lens 16 is 0 ppm to 300 ppm. In addition, a total content of D11 to D20 low molecular weight siloxanes is preferably 0 ppm to 290 ppm. The content of the D3 to D20 low molecular weight siloxanes is preferably 0 ppm to 20 ppm. The content of the D11 to D20 low molecular weight siloxanes is more preferably 0 ppm to 11 ppm.

The content of the low molecular weight siloxane can be controlled, for example, as follows.

(1) Using a commercially available low siloxane control grade silicone resin in which the low molecular weight siloxane in the material component is removed as much as possible.

(2) Releasing and removing the low molecular weight siloxane by heating at a predetermined temperature (for example, 150° C. to 200° C.) for a predetermined time (for example, 2 to 4 hours) after injection molding. Heating in this way is called secondary vulcanization, and the content of the residual low molecular weight siloxane can be adjusted by adjusting the heating temperature and the heating time.

(3) Reducing the content of the low molecular weight siloxane by immersing the silicone resin part after injection molding in an organic solvent and leaving the same for a predetermined time (for example, 6 hours) to elute the low molecular weight siloxane contained in the silicone resin part. As the organic solvent, a ketone solvent such as acetone, an olefin solvent such as normal hexane, an alcohol such as methyl alcohol, or the like can be used. The content of the residual low molecular weight siloxane can be adjusted by adjusting the type of the organic solvent, the immersion temperature, and the immersion time.

Experiment

Hereinafter, in order to evaluate the anti-fogging performance of the lamp 1 according to the present embodiment, condensing lenses 16 having different contents of low molecular weight siloxane were prepared. Then, the concentration of the low molecular weight siloxane in the prepared condensing lens 16 was measured, and an anti-fogging performance test using an oil bath was performed. The anti-fogging performance test using an oil bath is a test in which a test piece of the silicone resin part is sealed in a glass beaker covered with a plate coated with an anti-fogging coating, and heated to a temperature corresponding to a lighting state of the lamp and thereby it is possible to observe the state corresponding to a case where the vehicle lamp is lit on.

Preparation of Silicone Resin Part (Condensing Lens)

In lamps in Examples 1 and 2 and Comparative Examples 1 and 2 shown in Table 1, the condensing lenses 16, i.e., the silicone resin parts, were prepared by injection molding using a silicone elastomer having the material grades shown in Table 1 using the same mold and performing a post-treatment under the conditions shown in Table 1.

Measurement of Content of Low Molecular Weight Siloxane

The measurement of the content of the low molecular weight siloxane in the prepared silicone resin part was performed as follows.

(1) First, the silicone resin part was cut into 1 to 2 mm squares.

(2) The mass of the cut silicone resin part was measured.

(3) A predetermined amount of the low molecular weight siloxane was extracted with normal hexane.

(4) The total amount of the extraction solvent was separated by a gas chromatograph apparatus (Gas Chromatography 7980B manufactured by Agilent Technologies, Inc.) using a capillary column using helium as a carrier gas (mobile phase) under the condition of an injection temperature of 280° C., and detected using a flame ionization detector (FID).

(5) From the results, D3 to D10 and D11 to D20 low molecular weight siloxanes were quantified, the total amount of each low molecular weight siloxane was calculated, and the content (ppm) of the low molecular weight siloxane was calculated based on the mass obtained in (2).

Anti-Fogging Performance Test

Figure 3:
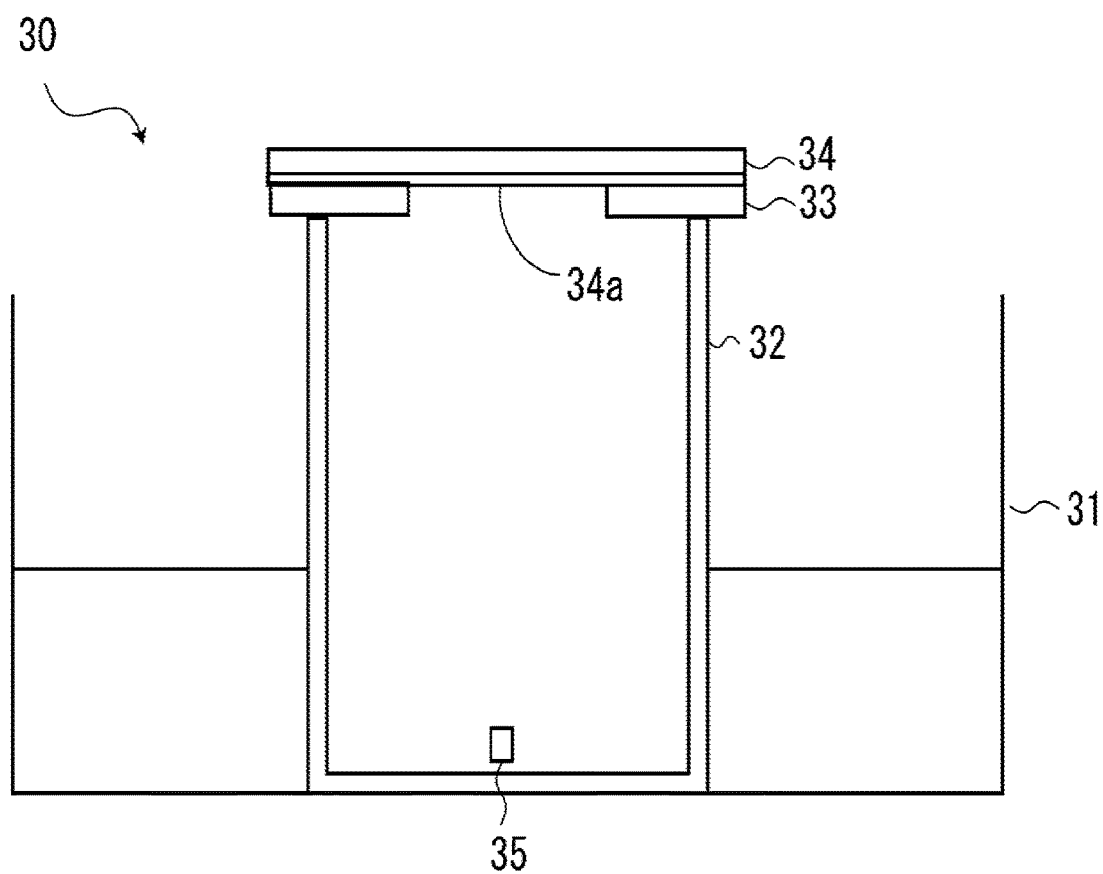
FIG. 3 is a schematic view showing an outline of an apparatus for carrying out an anti-fogging performance test on the above vehicle lamp.

The anti-fogging performance test was carried out by the following method using the following apparatus. FIG. 3 is a schematic view showing an outline of an anti-fogging performance test apparatus 30.

Apparatus:

Oil bath 31 (capacity is 38 L, manufactured by THOMAS KAGAKU Co., Ltd.)

Glass beaker 32 (glass beaker having capacity is 1 L, diameter is 95 mm, height is 160 mm, and glass thickness t is 2.1 mm)

Perforated glass plate 33 (one with a hole having diameter of 40 mm open in the center of square glass plate with 100 mm by 100 mm, and glass thickness t is 1.9 mm)

PC plate 34 with anti-fogging coating 34a (one obtained by coating square PC plate, having 100 mm by 100 mm and plate thickness is 3 mm, with acrylic anti-fogging coating material P containing anionic surfactant)

Method:

(1) The silicone resin part was cut into 1 to 2 mm squares to obtain a test piece 35.

(2) 0.8 g of the test piece 35 was weighed and put into the glass beaker 32.

(3) A perforated glass plate to which the PC plate 34 with an anti-fogging coating was attached was set in the glass beaker 32.

(4) The glass beaker 32 was placed in the oil bath 31 at a depth of 64 mm from the bottom surface and heated at 130° C. for 20 hours.

(5) After heating, the PC plate 34 with an anti-fogging coating was removed, and steam at about 40° C. was sprayed for 20 seconds to visually observe the state of the anti-fogging film.

(6) The state of the anti-fogging film was evaluated by being classified into the following five ranks. Rank 4 and 5 were passed.

Rank 1: fog occurs and the anti-fogging film is not clear.

Rank 2: fog occurs but the anti-fogging film becomes a water film.

Rank 3: fog occurs in the entire anti-fogging film in a moment, but the anti-fogging film soon becomes a water film.

Rank 4: fog occurs in a part of the anti-fogging film in a moment, but the anti-fogging film soon becomes a water film.

Rank 5: no fog.

The above experimental results are summarized in Table 1.

TABLE 1

| No. | Concentration of low molecular weight siloxane (D3 to D20) (ppm) | Concentration of low molecular weight siloxane (D3 to D10) (ppm) | Concentration of low molecular weight siloxane (D11 to D20) (ppm) | Material | Post-treatment condition | Result |
|---|---|---|---|---|---|---|
| 1 Comparative Example 1 | 6611 | 729 | 5382 | General lens grade* | No secondary vulcanization | Rank 2 (failed) |
| 2 Comparative Example 2 | 438 | 17 | 421 | Low siloxane control grade* | No secondary vulcanization | Rank 3 (failed) |
| 3 Example 1 | 290 | 5 | 285 | Low siloxane control grade* | Secondary vulcanization (4 hours at 170° C.) | Rank 4 (passed) |
| 4 Example 2 | 13 | 2 | 11 | Low siloxane control grade* | Secondary vulcanization (4 hours at 170° C.), and solvent immersion (5 hours at 50° C.) | Rank 5 (passed) |
| 5 Reference Example | — | — | — | No silicone resin part | — | Rank 5 (passed) |

*General lens grade: D3 to D10 1770 ppm or less
*Low siloxane control grade: D3 to D10 300 ppm or less As seen from Table 1, no influence on the anti-fogging performance is observed from Reference Example in which the silicone resin part is not used. In addition, in Examples 1 and 2 in which the concentration of the D3 to D20 low molecular weight siloxanes is 300 ppm or less, in the anti-fogging performance test, fog does not occur in any of them, or even when fog occurs in a part of them, the film immediately becomes a water film, and the anti-fogging performance does not deteriorate. On the other hand, in those in which the content of the D3 to D10 low molecular weight siloxanes is 17 ppm, which is the so-called low siloxane range, but the concentration of the D3 to D20 low molecular weight siloxanes exceeds 300 ppm, as in Comparative Example 2, fog occurs and the anti-fogging performance deteriorates in the anti-fogging performance test.

Therefore, in the anti-fogging performance test, it can be seen that the failure is due to the low molecular weight siloxane released from the condensing lens 16, i.e., the silicone resin part. In addition, it can be seen that in order to ensure the anti-fogging performance after lighting for a long time, it is preferable that the content of the D3 to D20 low molecular weight siloxanes is 300 ppm or less (the concentration of the D11 to D20 low molecular weight siloxanes is 290 ppm or less) in the silicone resin part, as in Examples 1 and 2. In addition, it can be seen that, it is preferable that the content of the D3 to D20 low molecular weight siloxanes is 20 ppm or less (the concentration of the D11 to D20 low molecular weight siloxanes is 11 ppm or less), as in Example 2.

The reason why it is preferable to control the silicone resin part by paying attention to the content of D3 to D20, particularly D11 to D20, low molecular weight siloxanes is considered as follows. The distribution of low molecular weight siloxanes released from silicone resin products varies depending on the heating temperature. At a heating temperature of 50° C., a lot of D3 to D10, mainly D5, are released. The higher the heating temperature, the greater the amount of low molecular weight siloxane released, with D14 to D20 predominant at 300° C. It is considered that the inside of the housing 4 of the vehicle lamp 1 is in a relatively high temperature, and in particular, the temperature may reach 100° C. to 150° C. around the light source, and the amount of D11 to D20 released is large. Therefore, when the content of the D3 to D20 low molecular weight siloxanes contained in the silicone resin part is controlled by paying attention to the content of the D11 to D20 siloxanes released, the total amount of the low molecular weight siloxane released can be indirectly controlled.

In the present embodiment, the content of the low molecular weight siloxane contained in the silicone resin part is controlled to prevent the deterioration in anti-fogging performance. It is the concentration of the low molecular weight siloxane in the air in the housing that is directly involved in the deterioration in anti-fogging performance of the anti-fogging film, but it is difficult to control this. On the other hand, in the present embodiment, the content of the low molecular weight siloxane is controlled, the total amount of low molecular weight siloxanes released into the housing can be indirectly controlled. Therefore, even when the number and size of the silicone resin part or the capacity of the housing changes, it is possible to accurately design the configuration of the silicone resin part that does not interfere with the anti-fogging performance.

In the present embodiment, the effect of lowering interfacial tension between the water droplet and the anti-fogging film can be reduced by reducing the content of the low molecular weight siloxane. Therefore, in particular, when an anti-fogging coating material containing a surfactant is used as the anti-fogging coating material, the deterioration in anti-fogging performance can be prevented.

In the above description, the condensing lens 16 has been described as an example of the silicone resin part, but the silicone resin part in the present invention is not limited to this. Needless to say, it includes various silicone resin parts used in vehicle lamps.

Although the preferred embodiments of the present invention have been described above, the above embodiments are merely examples of the present invention, and these embodiments can be combined based on knowledge of those skilled in the art, and such forms are also included in the scope of the present invention.

The present application is based on a Japanese Patent Application No. 2020-81466 filed on May 1, 2020, contents of which are incorporated herein by reference.

The invention claimed is:
1. A vehicle lamp comprising:
a lamp body that has an opening in a direction of light radiation;
a front cover that covers the opening to define a housing and includes, on an inner surface, an anti-fogging film mainly composed of a synthetic resin;
a light source that is disposed in the housing; and a silicone resin part that is disposed in the housing, wherein a content of D3 to D20 cyclic low molecular weight siloxanes in the silicone resin part is 0 ppm to 300 ppm in terms of mass.

2. The vehicle lamp according to claim 1, further comprising:

a lens that is disposed in the housing, wherein at least one of the silicone resin part is the lens.

3. The vehicle lamp according to claim 1, wherein a content of D11 to D20 cyclic low molecular weight siloxanes in the silicone resin part is 0 ppm to 290 ppm in terms of mass.

4. The vehicle lamp according to claim 1, wherein the content of the D3 to D20 cyclic low molecular weight siloxanes is 0 ppm to 20 ppm in terms of mass.

5. The vehicle lamp according to claim 1, wherein the content of the D11 to D20 cyclic low molecular weight siloxanes is 0 ppm to 11 ppm in terms of mass.

6. The vehicle lamp according to claim 1, wherein the anti-fogging film contains an anti-fogging coating material containing any of anionic, cationic and nonionic surfactants.

* * * * *